United States Patent Office 3,131,022
Patented Apr. 28, 1964

3,131,022
PROCESS FOR PRODUCING LITHIUM CARBONATE WITH CONCOMITANT RECOVERY OF REACTANTS
Maurice Archambault, Quebec, Quebec, Canada, assignor to Ministere des Richesses Naturelles, Province de Quebec, Canada
No Drawing. Filed Jan. 9, 1961, Ser. No. 81,225
Claims priority, application Great Britain Feb. 9, 1960
13 Claims. (Cl. 23—63)

This invention relates to the extraction of lithium from calcined lithium-bearing minerals. Particularly it relates to the use of beta-spodumene as the starting material.

The prior art has suggested that caustic soda and sodium salts in general can be used with hot water to extract lithium from beta-spodumene. The suggestion is, however, that the yield of lithium is not good using sodium compounds alone, except by using prohibitive amounts of water and by resorting to repetitive and elaborate precipitation and purification procedures. This is confirmed by the fact that the art has suggested an improvement, the use of both a sodium and a calcium compound for treatment of the lithium-containing material.

In contrast to these teachings, the applicant has now found that there are conditions under which marketable lithium carbonate can be derived economically by the hydrothermal treatment of beta spodumene or other acceptable lithium-bearing materials with a mixture of sodium carbonate and sodium hydroxide, in the presence of relatively small amounts of water. The applicant has also found that the action of his aqueous mixture of sodium carbonate and sodium hydroxide was considerably impaired by addition of calcium compounds, in contradiction with a recent broad paper disclosure stating that lithium extraction was improved when both calcium and sodium salts were jointly used.

In accordance with the invention, the lithium-bearing charge is brought into contact with hot water in an amount from about 1 to about 10 times the weight of the lithium-bearing materials, in the presence of a mixture of sodium carbonate and sodium hydroxide, said sodium chemicals being jointly supplied in an amount at least 5 times the weight of the lithium oxide present, the temperature being within the range from about 60° C. to about 130° C. When the reaction is effected at above 105° C., a pressure vessel must be used to prevent water from leaving the reaction mixture. An aqueous slurry or mixture is thus formed containing hydrated sodium aluminosilicate (an anisometric zeolite) together with a silicated lithium carbonate or compound of neo-formation.

The slurry or the solids from the slurry are cooled and then contacted at a temperature below about 40° C., in presence of water with ammonium carbonate in an amount not exceeding about 20 times the weight of the lithium oxide present. The anisometric sodic zeolite is thus changed to an ammoniated zeolite, whereas the newly formed silicated lithium carbonate is extracted under the form of a complex carbonate of lithium and ammonium, which is very soluble in cold water. The ammoniated zeolate and silicic residue are then separated from the lithium-bearing solution, which contains also the sodium recovered from the sodic zeolite. The solution is then heated to drive off carbon dioxide and ammonia gases, so as to insolubilize lithium carbonate while the sodium remains in solution. This solution after proper treatment is advantageously returned to the process for decomposing a new lithium-bearing charge. The solid residue left after lithium and sodium extraction is mainly constituted of ammoniated zeolite and may be sold as such or it could be heated to volatilize its ammonia content which is returned to the leaching process, while the remainder of the residue is discarded.

The amounts of sodium compounds used are critical. Indeed, when treating beta spodumene with the sodium-bearing mixture mentioned above, four different aluminosilicates are liable to form, depending on the temperature and on the amount of the sodium compounds used with respect to the lithium content of the charge.

The sodium aluminosilicates that could be produced are—

(1) An anhydrous aluminosilicate jadeite-like in chemical composition:

(2) A sodic cancrinite approximating:

(3) A chlorine-free sodalite approximating:

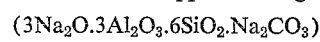

(4) An anisometric sodic zeolite:

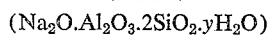

In the applicant's process the only aluminosilicate of interest is the anisometric sodic zeolite. To obtain this zeolite, the atomic ratio of the sodium in the reactants to the ltihium in the charge should not exceed about 3.5, otherwise sodic cancrinite or sodalite would be formed. The formation of the two latter products must be avoided in this process: (a) the ayre reactant-wasting because of their high sodium contents and (b) their sodium is not recoverable by treatment with aqueous ammonium carbonate. Is also taboo the formation of the anhydrous sodium aluminosilicate, since it causes a lower lithium extraction yield and hinders the recovery of its sodium content, by the ammonium carbonate treatment.

DECOMPOSING

The use of the aqueous decomposing mixture mentioned above gives unusual results in the applicant's process. It is noteworthy that the reaction works as well with a low-grade lithium ore as with a high-grade lithium concentrate, and this, without any additional consumption of the sodium-bearing reactants. Almost complete recoveries of lithium may be obtained, provided that the two sodium-bearing components of the mixture are jointly supplied in a lump amount ranging from about 5 to about 12 times the weight of the lithium oxide present, the relative proportions of said components corresponding to a molecular ratio of $Na_2CO_3$ to $NaOH$ ranging from about 0.5 to 5.0.

The applicant has found that an amount of water lower than 1.5 times the weight of the lithium-bearing charge may cause excessive thickening of the slurry together with the formation of undesirable aluminosilicates. The amount of water preferred is from about 1.5 to about 5 times the weight of the lithium-bearing charge.

Temperature and time of reaction depend on each other: the higher the temperature, the faster the reaction is completed. Reaction time may vary from about 1 hour to about 36 hours, and the temperature may range from about 60° C. to about 130° C. Both factors are also dependent on the excess of the sodium-bearing mixture used. But in every case, within these ranges, the reaction will reach completion if the reaction time is sufficiently long.

The probable chemical reactions involved in the decomposing step can be shown in simplified forms, as follows:

(a)

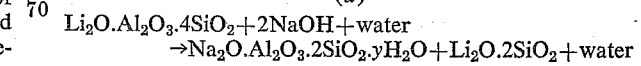

(b)

$$Li_2O \cdot Al_2O_3 \cdot 4SiO_2 + Na_2CO_3 + water$$
$$\rightarrow Na_2O \cdot Al_2O_3 \cdot 2SiO_2 \cdot yH_2O + Li_2CO_3 + 2Si(OH)_4 + water$$

(c)

$$Li_2CO_3 + 2Si(OH)_4 + water \rightleftharpoons Li_2O \cdot 2SiO_2 + CO_2 + water$$

As may be seen, the whole lithium appears to be taken off of the spodumene molecule together with half of its silica content whereas an insoluble silicated lithium carbonate or compound is apparently formed which will be extracted as a silica free lithium ammonium carbonate in a subsequent leaching operation that will be discussed now.

LEACHING

The leaching, as proposed by the applicant, is part of the invention and is of primary importance. This operation owes its surprising effectiveness to the use of ammonium carbonate. The functions of the ammonium carbonate solution are various and can best be summarized by the following approximate equation:

$$Li_2O \cdot 2SiO_2 + Na_2O \cdot Al_2O_3 \cdot 2SiO_2 \cdot yH_2O + water$$
$$+ 4(NH_4)_2CO_3 \rightarrow [(NH_4)_2O \cdot Al_2O_3 \cdot 2SiO_2 \cdot yH_2O]$$
$$+ [(NH_4)_4 \cdot Li_2(CO_3)_3] + 2NH_4OH + 2Si(OH)_4$$
$$+ water + Na_2CO_3$$

This equation shows the effect of the ammonium carbonate solution on the products obtained in the decomposing step, that is, on the anisometric sodic zeolite and on the lithium silicated compound. The undissolved lithium of the slurry is apparently brought into solution by the formation of an isomorphous mixture of ammonium carbonate and lithium carbonate. This complex salt would have a variable composition and is tentatively represented by the following formula:

$$(yNH_4 \cdot zLi)CO_3$$

$y+z$ being equal to 2.

In actual cases, to favour leaching with minimum amount of water, it is recommended to give to $y$ a value at least equal to $z$ or preferably about two times greater, but in most occasions not exceeding three times. The essential functions of ammonium carbonate may be explained as follows: as the anisometric sodic zeolite formed in the decomposing step has the property of being of the ion-exchange type, the $NH_4$ ions of the ammonium carbonate take the place of the Na ions of the sodic zeolite, the latter ions being recovered as sodium carbonate. Sodium carbonate remains as such in the solution, the formation of sodium silicate being prevented by the presence of the ammonium compound in the solution. In this way, silica has no interfering effect on the technology of the process. The solid residue left after leaching is essentially an ammoniated zeolite, which could be sold for catalyst carrier, ion exchangers, fillers, etc. As an alternative, the $NH_4$ ions of the ammoniated zeolite may be recovered under the form of $NH_3$ gas by simply heating it at a temperature between 150° C. and 500° C., preferably around 400° C., in a neutral or slightly reducing atmosphere. Ammonium ions may also be displaced from the zeolite by various other means. For instance, the residue may be mixed with milk of lime or with aqueous barium or strontium hydroxides, at temperatures of about 80° C.:

$$(NH_4)_2O \cdot Al_2O_3 \cdot 2SiO_2 \cdot xH_2O + Ca(OH)_2 + water$$
$$\rightarrow (CaO \cdot Al_2O_3 \cdot 2SiO_2 \cdot xH_2O) + NH_3 + water$$

Another way of recovering the ammonium is to react the residue with solutions of polyvalent salts (e.g. ferrous salts). After the recovery of $NH_3$, the final residue is under a semi-processed form that could be the departure of interesting work on the recovery of other valuable components of this residue.

In practice, the leaching operation may be carried on in various ways. Volume of water, quantity and concentration of ammonium carbonate, number of leaching steps, may all be varied. Temperature and time themselves may vary from 0° C. to 40° C. and from 5 minutes to 2 hours respectively. As a general rule, it can be said that the volume of water needed to solubilize the complex isomorphous mixture of ammonium and lithium carbonate and the sodium of the residue, decreases as the concentration of ammonium carbonate in solution increases.

Any type of ammonium carbonate may be used, but normal carbonate $[(NH_4)_2CO_3]$ is preferred because of its greater solubility in water (up to 100 parts dissolved in 100 parts of water at 15° C.).

The weight ratio of water to lithium-bearing material in the leaching operation may vary from 1 to 10, depending on the strength of the ammonium carbonate solution. It is however preferable to use generally the greatest practical concentration of ammonium carbonate in order to minimize the amount of water needed. The mother solution itself may be used as leaching medium; but this is recommended principally when small excess of reactants has been used. Indeed, when high excess of chemical reactants was employed in the decomposing step, there is a too large amount of unreacted chemicals, and this would tend to promote the formation of undesirable side reactions with ammonium carbonate.

The amount of ammonium carbonate used in the leaching operation of the applicant's process must be over 3 times the weight of the lithium oxide present, so as to supply at least one mole of $(NH_4)_2CO_3$ for each mole of $Li_2O$ to be leached. Preferably, ammonium carbonate should be used in amounts varying from about 5 to about 20 times the weight of the lithium oxide present.

When the leaching operation is completed, the slurry is filtered to separate, from the insoluble solid residue, a clear solution—practically free from silica and other common impurities ($R_2O_3$, Fe, etc.), and containing the major part of the isomorphous mixture of ammonium and lithium carbonate, and also of the sodium carbonate. However, as the solid residue has the property of withholding much water as cake moisture, a subsequent washing is required to take out of the cake the remaining lithium and sodium. Evidently, this is particularly indispensible when the leaching has been done with a small amount of solution, because of the high lithium and sodium contents of the latter. It is obvious that the amount of water used in the washing operation will be such that it lends itself to sound economics.

INSOLUBILIZING

The next step in the applicant's process is to insolubilize the lithium carbonate present as lithium-ammonium carbonate in the leach liquor. This insolubilizing step owes its surprising effectiveness to the following properties of the carbonates present: (a) the instability of the complex or isomorphous mixture of ammonium and lithium carbonate which tends to dissociate into $Li_2CO_3$ and $(NH_4)_2CO_3$ when submitted to appropriate physical means, (b) the instability of $(NH_4)_2CO_3$ which also tends to dissociate into its individual constituents $NH_3$ and $CO_2$, and (c) the relative water-insolubility of $Li_2CO_3$.

Among the physical means which can be used to effect the above dissociation, there are heat, beating, agitation, ultrasonics, vacuum, etc. For instance, when heat is used, the leaching and washing solutions are brought up to between around 60° C. and about 100° C., whereby the $(yNH_4 \cdot zLi)CO_3$ dissociates into $Li_2CO_3$ and $(NH_4)_2CO_3$, the latter splitting into $NH_3$ and $CO_2$ gases which are recovered to make up anew $(NH_4)_2CO_3$; and thus marketable $Li_2CO_3$ is insolubilized. It is obvious that the higher the temperature, the faster the dissociation of the isomorphous mixture of ammonium and lithium carbonate and the insolubilizing of the $Li_2CO_3$. The crystalline lithium carbonate is recovered by simply separating it from the hot solution by filtration or centrifugation.

By proper treatment of the remaining solution, the sodium-bearing mixture, which was used as reactant for spodumene, may be reformed and reused to treat new beta spodumene. For example, the sodium-bearing solution left after lithium carbonate precipitation may be partly causticized with an aqueous alkaline earth hydroxide, such as $Ca(OH)_2$ at a temperature of around 80° C. by currently used methods to regenerate the NaOH needed for the reaction. So those skilled in the art will conclude that the sequence of the operations of the process may easily be made cyclic in a number of different advantageous ways, due to the fact that the sodium ions used up in the reacting mixture as reactant are regenerated by ammonium carbonate and returned to the decomposing step with the unspent sodium.

Calcined lepidolite, petalite and eucryptite would behave essentially like beta-spodumene, giving approximately the same reaction products as those mentioned above.

The minimum temperatures required for calcining the above minerals are as follows: above about 850° C., for lepidolite; above about 980° C., for eucryptite; and above about 680° C., for petalite.

For the purpose of giving further details to illustrate the invention, the applicant supplies the following examples in which all parts mentioned are by weight.

DECOMPOSING EXEMPLIFIED

In the following Examples 1, 2 and 3 sodium carbonate and sodium hydroxide were jointly used in a lump amount of about 7.3 times the weight of the lithium oxide present in the charge, and in a proportion corresponding to a molecular ratio of $Na_2CO_3$ to NaOH equal to 0.66.

Example 1

One hundred parts of a beta spodumene concentrate containing 4.5% $Li_2O$ (corresponding approximately to a mixture of 60% beta-spodumene, 25% feldspars and 15% quartz) were mixed and agitated with 12 parts of NaOH, 21 parts of $Na_2CO_3$ and 400 parts of water and heated in a closed vessel, at a temperature of 85° C., for about 24 hours. The slurry containing the reaction product was then filtered. An analysis of the solid residue revealed that the original beta-spodumene had been almost completely converted to anisometric sodic zeolite.

A higher temperature would have given the same results in a shorter period of time.

Example 2

In this example, the charge to the reactor was the same as in Example 1, except that water was half the amount only, i.e., 200 parts. The reaction was also performed the same way as in Example 1, except that the temperature was 70° C., instead of 85° C., and the length of time 16 hours instead of 24. The aqueous reaction product was then filtered. An analysis of the filter cake showed that about three quarters of the original beta-spodumene had been decomposed.

A larger excess (actual excess being 2.3 times the theoretical amount) of the sodium-bearing chemicals would have improved the decomposition.

Example 3

Here the charge to the reactor was exactly the same as in Example 1 and the reaction was performed the same way as in Example 1, except that the temperature was 100° C., instead of 85° C., and the time of reaction was 4 hours instead of about 24 hours. The aqueous reaction product was then filtered. An analysis of the filter cake revealed that about 60% of the original beta-spodumene had been decomposed.

A larger amount of the sodium-bearing mixture would have improved the decomposition. A higher temperature would have increased both the kinetics of the decomposition and the lithium extraction.

LEACHING EXEMPLIFIED

Example 1
[Using a concentrated ammonium carbonate solution]

The solid residue obtained in Example 1 was leached for 1 hour at a temperature of about 25° C. with 200 parts of an aqueous solution containing 75% of ammonium carbonate. The resulting slurry was then filtered and the wet solid residue obtained was repulped and washed with 100 parts of water for approximately 30 minutes. The repulped residue was filtered again and a solid residue was collected, which, when dry, was found to contain 0.35% $Li_2O$ and 0.36% $Na_2O$.

Since the dry contents of the first residue, (i.e., the one obtained at the decomposing step) were 3.5% $Li_2O$ and 10.8% $Na_2O$, it means that the ammonium carbonate solution has extracted 93% of the lithium and 97% of the sodium.

Example 2
[Using a diluted ammonium carbonate solution]

The solid residue obtained in Example 1 was leached for about 1 hour at room temperature with about 100 parts of a solution containing about 17% by weight of ammonium carbonate. Decantation was then effected and the settled solids were leached again with a similar solution. This operation was repeated three additional times always with the same amount (about 100 parts) and the same strength of solution (about 17%). The solid residue was then separated from the lithium-bearing solution, which was found to contain about 90% of the lithium present in the charge and about 78% of the sodium of the solid residue obtained at the decomposing step.

Example 3
[Using water only]

Attempts to leach the products obtained at the decomposing step, using water only, have all been discouraging: the leaching and filtering operations were difficult, the lithium yield was poor the extracted lithium required purification, and there was no regeneration of the sodium spent for the conversion of beta spodumene to new products.

The addition of lime to the water was tried also, but proved to be a make-shift only.

The following table shows that by reacting same amount of beta spodumene with same mixture of sodium hydroxide and sodium carbonate and for same period of time, i.e., 16 hours, lithium extractions of 76.8% and 90.0% were obtained at 70° C. and 95° C. respectively, with corresponding sodium regenerations of 87.9% and 84.3%. It shows also that for a reaction of 3 hours at 125° C. and a different mixture of reactants, a lithium recovery of 86.2% was effected.

TABLE 1.—EFFECT OF VARIOUS FACTORS ON LITHIUM EXTRACTION AND ON SODIUM REGENERATION [1]

| Test [3] | Decomposing | | | | Leaching [2] | |
|---|---|---|---|---|---|---|
| | Reactants added | | Conditions | | Lithium extracted, percent | Sodium regenerated [1] percent |
| | NaOH (parts) | $Na_2CO_3$ (parts) | Temp., °C. | Time (hrs.) | | |
| A | 12 | 21 | 70 | 16 | 76.8 | 87.9 |
| B | 12 | 21 | 95 | 16 | 90.0 | 84.3 |
| C | 6 | 32 | 125 | 3 | 84.5 | 73.3 |
| D | 9 | 20 | 125 | 3 | 86.2 | 74.7 |

[1] Sodium regeneration is defined here by $$\frac{x-y}{x}(100)$$

where
$x$ = sodium content of the sodium aluminosilicate formed when decomposing spodumene
$y$ = sodium content of the sodium aluminosilicate left after leaching with aqueous ammonium carbonate.
[2] Leaching was effected here using aqueous ammonium carbonate as lixiviant.
[3] All these tests were effected with 100 parts of a calcined spodumene concentrate containing 4.5% $Li_2O$, together with from 200 to 400 parts of water.

INSOLUBILIZING EXEMPLIFIED

The final lithium-bearing solution, as obtained after the last filtration in Example 1 for leaching was heated to cause the evolution of carbon dioxide and ammonia gases, and evaporated down to about one third of its original volume, thus causing the formation of 8 parts of crystalline lithium carbonate from a possibility of 11 parts. The unprecipitated lithium carbonate would be returned to the process with the unspent and regenerated portions of the sodium-bearing chemicals.

The applicant claims:

1. A process for extracting lithium from calcined lithium-bearing silicate, which comprises, reacting said silicate hydrothermally with an aqueous mixture of sodium carbonate and sodium hydroxide to produce an aqueous mixture containing solid silicated lithium carbonate and sodium aluminosilicate, cooling said mixture and leaching it with aqueous ammonium carbonate to recover its lithium and sodium content in the form of a solution separated from a solid residue.

2. A process, as defined in claim 1, wherein sodium carbonate and sodium hydroxide are used in a total amount ranging from about 5 to about 12 times the weight of the lithium oxide present, said sodium carbonate and sodium hydroxide being in a relative proportion corresponding to molecular ratio of $Na_2CO_3$ to NaOH varying from about 0.5 to about 5.0.

3. A process, as defined in claim 1, wherein water is present in the aqueous mixture of sodium carbonate and sodium hydroxide in an amount ranging from about 1.5 to about 5 times the weight of the lithium-bearing charge.

4. A process, as defined in claim 1, wherein the primary reaction is performed at a temperature within the range from about 60° C. to about 130° C., for a period of time from about 1 hour to about 36 hours, to produce an aqueous mixture containing anisometric sodic zeolite and solid silicated lithium carbonate of neo-formation.

5. A process, as defined in claim 1, wherein the aqueous mixture containing the solid silicated lithium carbonate and sodium aluminosilicate is cooled and contacted at a temperature from about 0° C. to about 40° C., with an aqueous solution of ammonium carbonate, said ammonium salt being in an amount from about 5 to about 20 times the weight of the lithium oxide present in the charge, thereby to dissolve the lithium from the silicated lithium carbonate in the form of complex lithium carbonate and to separate a lithium, sodium and ammonium carbonate solution from a practically lithium and sodium-free solid residue containing ammoniated zeolite.

6. A process for extracting lithium carbonate from calcined lithium-bearing silicate which comprises: contacting said silicate with an aqueous mixture of sodium carbonate and sodium hydroxide under hydrothermal conditions thereby to form a mixture containing anisometric sodic zeolite and silicated lithium carbonate, leaching the mixture with ammonium carbonate and cold water thereby to solubilize its lithium content in the form of a carbonate in water and to remove the sodium from the anisometric sodic zeolite as a dissolved carbonate, separating from the solution the solid residue, treating the solution to evolve carbon dioxide and ammonia gases and to insolubilize thereby the lithium carbonate, and recovering crystalline lithium carbonate from the solution.

7. A process, as defined in claim 6, wherein the desired crystalline lithium carbonate is recovered directly from the lithium-bearing solution by agitating and heating said solution at a temperature from about 60° C. to about 100° C., to evolve carbon dioxide and ammonia gases and thereby to insolubilize the lithium carbonate, and separating crystalline lithium carbonate from the solution.

8. A cyclic and integrated continuous process, for producing lithium carbonate from calcined lithium-bearing silicate, with concomitant regeneration of the treating chemicals, which comprises the steps of: (a) DECOMPOSING said silicate hydrothermally with an aqueous mixture of sodium carbonate and sodium hydroxide to produce an aqueous mixture containing newly formed silicated lithium carbonate and anisometric sodic zeolite; (b) LEACHING said resulting mixture with cold aqueous ammonium carbonate to recover its lithium and sodium content in a solution form, separating therefrom an ammoniated solid residue, treating said residue to evolve its ammonia content as a gas, (c) INSOLUBILIZING the lithium content of the solution obtained in the leaching step by treating said solution to evolve carbon dioxide and ammonia gases; (d) RECYCLING separately the substantially lithium-free solution in the leaching step, the ammonia and carbon dioxide evolved in the insolubilizing step, the ammonia gas evolved in the treatment of the ammoniated solid residue, (e) RECOVERING separately lithium carbonate and aluminum silicate by-product.

9. A cyclic and integrated continuous process, for producing lithium carbonate from calcined lithium-bearing silicate, with concomitant regeneration of the treating agents, which comprises the steps of: (a) DECOMPOSING said silicate hydrothermally with a mixture of sodium carbonate and sodium hydroxide jointly in an amount ranging from about 5 to about 12 times the weight of the lithium oxide present, and in a proportion corresponding to molecular ratio of $Na_2CO_3$ to NaOH varying from about 0.5 to about 5.0 in presence of water in an amount ranging from about 1.5 to about 5 times the weight of the lithium-bearing charge, at a temperature within the range from about 60° C. to about 130° C., for a period of time from about 1 hour to about 36 hours, to produce an aqueous mixture containing anisometric sodic zeolite and silicated lithium carbonate of neo-formation; (b) LEACHING the mixture obtained in the decomposing step by contacting it at a temperature from about 0° C. to about 40° C. with an aqueous solution of ammonium carbonate, said ammonium salt being in an amount from about 5 to about 20 times the weight of the lithium oxide present in the charge, thereby to solubilize its lithium content and to remove the sodium from the anisometric sodic zeolite produced, and regenerating the sodium required in the decomposing step, and separating the solid residue containing an hydrated ammonium aluminosolicate from the lithium carbonate-bearing solution; (c) INSOLUBILIZING the lithium content of the solution obtained in the leaching step by heating and agitating said solution at a temperature from about 60° C. to about 100° C., to drive off carbon dioxide and ammonia gases, and separating crystalline lithium carbonate from the mother liquor and returning the mother liquor to the leaching step; (d) RECOVERING separately lithium carbonate and a by-product consisting of an anisometric ammoniated zeolite produced at the leaching step, and treating said ammoniated zeolite to evolve its ammonia as a gas, and returning said regenerated gas to the leaching step.

10. A process, as defined in claim 9, wherein the solution from which crystalline lithium carbonate has been removed is partly causticized with lime to produce sodium hydroxide and then returned to the decomposing step and wherein the hydrated ammonium aluminosilicate is treated to evolve its ammonia content, and said ammonia is returned to the leaching step.

11. A process, as defined in claim 1 wherein the calcined lithium-bearing silicate is beta spodumene.

12. A process, as defined in claim 1, wherein the lithium-bearing silicate treated is a mineral selected from the group consisting of petalite, eucryptite and lepidolite, previously calcined to above about 680° C., 980° C., and 850° C., respectively.

13. A method of preparing a calcined lithium-bearing silicate to a state from which lithium values may be recovered, comprising, reacting said silicate hydrothermically with an aqueous mixture of sodium carbonate and sodium hydroxide in a total amount ranging from about 5 to about 12 times the lithium oxide present in said calcined lithium-bearing silicate, said sodium carbonate and sodium hydroxide being in a relative proportion corresponding to the molecular ratio of $Na_2CO_3$ to $NaOH$ varying from about 0.5 to about 5 to produce an aqueous mixture containing solid silicated lithium carbonate and sodium aluminosilicate.

References Cited in the file of this patent

UNITED STATES PATENTS 1,355,381 Blackmore _____ Oct. 12, 1920

FOREIGN PATENTS 596,302 Canada _____ Apr. 19, 1960